(No Model.) 2 Sheets—Sheet 1.
J. A. ELAM.
PLANTER.
No. 519,248. Patented May 1, 1894.
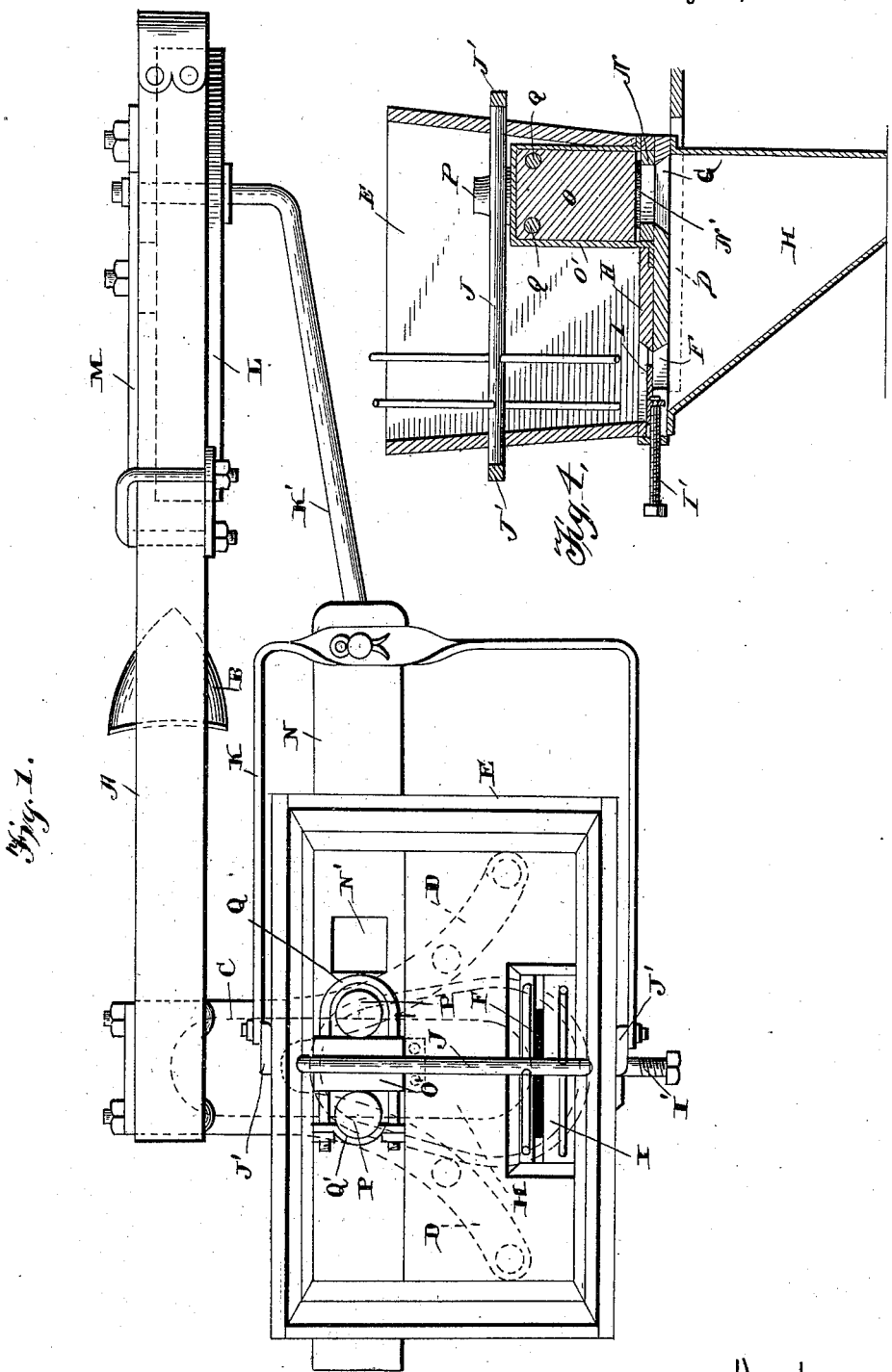
Witnesses
Geo. E. Freeh
Roland A. Fitzgerald
Inventor
J. A. Elam
By Lehmann Pattison & Neeft
Attys.

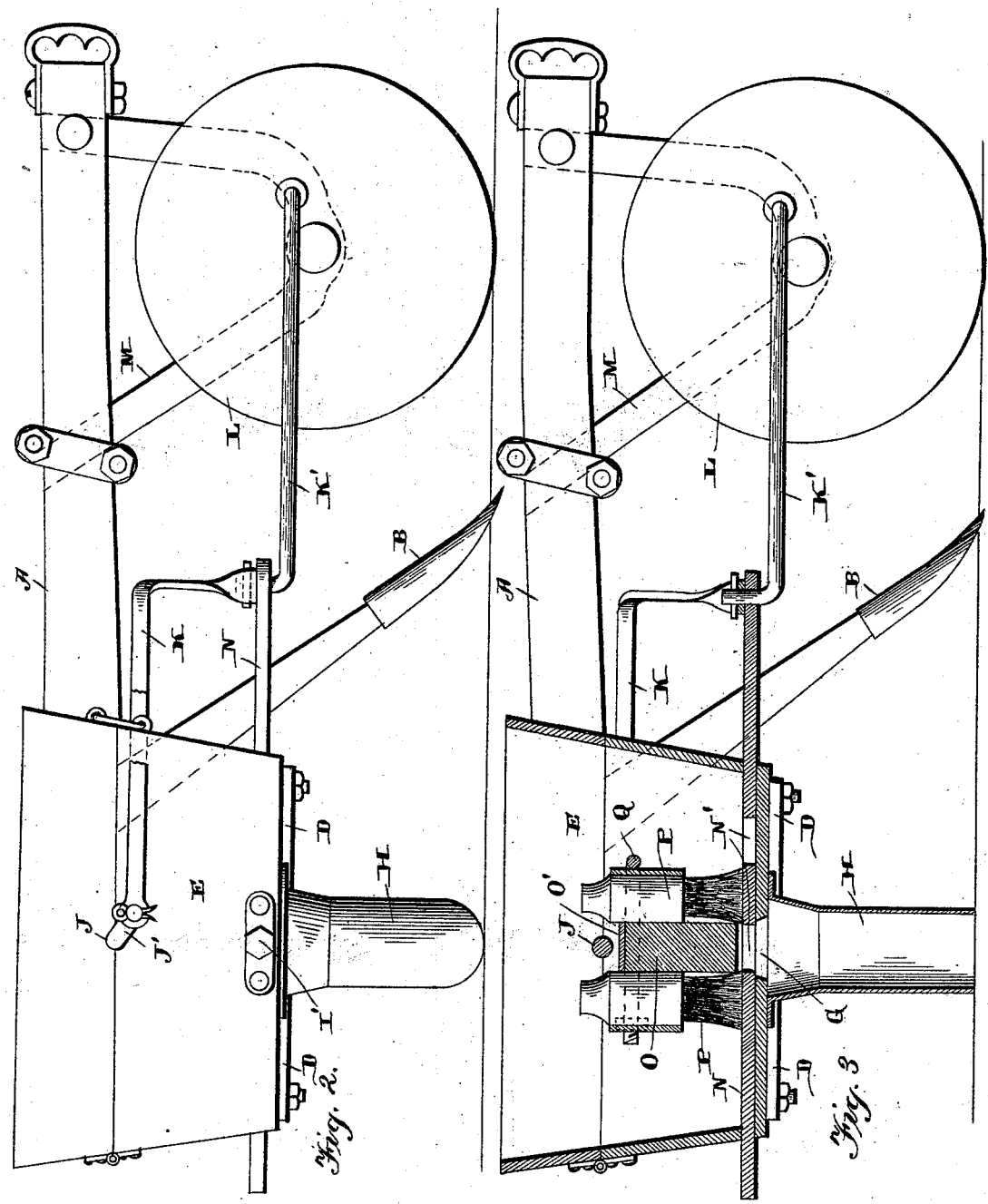

United States Patent Office.

JAMES ALEXANDER ELAM, OF MURFREESBOROUGH, TENNESSEE.

PLANTER.

SPECIFICATION forming part of Letters Patent No. 519,248, dated May 1, 1894.

Application filed February 8, 1893. Renewed March 3, 1894. Serial No. 502,279. (No model.)

*To all whom it may concern:*

Be it known that I, JAMES ALEXANDER ELAM, of Murfreesborough, in the county of Rutherford and State of Tennessee, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters; and it consists in the novel combination and arrangement of parts which will be fully described hereinafter, and particularly referred to in the claims.

The object of my invention is to provide an improved planter which may be used either for corn or cotton and which may be attached to an ordinary shovel plow.

Referring to the accompanying drawings,— Figure 1 is a plan view of my improved planter. Fig. 2 is a side elevation of the same. Fig. 3 is a central sectional view. Fig. 4, is a cross sectional view of the hopper.

A, designates the beam and B, the shovel of an ordinary plow to which my improved planter may be attached. Bolted to the rear end of the beam A, is the bent plate C, which is forked at its lower end as shown at D, and upon this forked end is supported the hopper E. Upon opposite sides of the bottom of the hopper are the seed dropping openings F, and G, which lead into the tube H, through which the seed is conducted into the furrow made by the plow B. The opening F, is for the dropping of cotton seed and its capacity is regulated by the slide I, which is adjustable thereover by the screw I', projecting from the hopper side. For agitating the cotton seed and working it down into the said opening a transverse shaft J, is extended through the hopper having cranks J', at each end which are connected to the ends of the yoke K extending rearward thereto. The forward end of this yoke is connected to the rod K', leading to the drive wheel L, to which it is eccentrically secured. This wheel is journaled in a U-shaped frame M, which is removably secured to the beam A. A longitudinally movable slide N, is provided having openings N', for carrying the corn back to the opening G, when the machine is used as a corn planter. The projected end of this slide is secured to the rod K', and also reciprocated by the wheel L. The slide N, reciprocates beneath the post O, supported thereover and clamped to opposite sides of this post are the brushes P. The clamp Q, is in the form of a U— and extends through the said post holding one brush in its curved end while the other brush is held in position by the plate Q', which is secured on the ends of the clamp Q. The slide N, being withdrawn sufficiently far the seed drop in the openings N', after which they are pushed beneath the brushes and dropped through the opening G, the brushes preventing seed from dropping through said opening which has not been deposited in the openings N'. The portion of the hopper above the shaft J, is adapted to turn upward on hinges located at one end thereof so that the said shaft may be removed together with the yoke K, which latter may be easily detached from the wheel L, thus constituting the machine a corn planter, or the motion of the slide N, may be stopped when the machine is to be used for cotton seed dropping. It is apparent however, that the yoke need not be detached from the rod K' when the corn is to be dropped as the agitator may continue its vibrations within the hopper during this operation and thereby materially assist the movement of the corn toward the slide. The post O, is supported by means of a bent metallic band O', the ends of which depend on either side of the slide N, where they are suitably secured to the bottom of the hopper. Several slides N, may be provided having openings N', of different sizes so that the same machine may be used for either large or small corn, or for seed other than corn which it may be desired to deposit by the machine. The whole mechanism being removably secured to an ordinary plow embodies practically two independent machines in one without regard to the several kinds of seeds the machine itself is adapted to plant.

Having thus fully described my invention, what I claim as new, and desire to secure by Letters Patent, is—

1. In a convertible planter, the combination of a hopper provided with a slide and an agitator, a yoke secured detachably to the slide and at its ends to the cranks of the agitator, wheel L and rod K' connecting the wheel and yoke, substantially as shown and described.

2. The combination of a hopper having seed openings in its bottom, a suitable support for the hopper, a longitudinally movable slide in the hopper having formed therein seed perforations, a post, a bent metallic band to which the same is secured and the ends of which band extend down on opposite sides of the said slide to the hopper bottom, and a brush clamped to each side of the post, substantially as shown and described.

In testimony whereof I affix my signature in presence of two witnesses.

JAMES ALEXANDER ELAM.

Witnesses:
W. R. SINGLETON,
O. H. GAMEWELL.